United States Patent [19]
Lidstone et al.

[11] Patent Number: 5,941,065
[45] Date of Patent: Aug. 24, 1999

[54] STOWABLE MIXER EJECTION NOZZLE

[75] Inventors: Gary L. Lidstone, Federal Way; Larry T. Clark, Enumclaw; Imre A. Szupkay, Othello; David L. Sandquist, Renton, all of Wash.

[73] Assignee: The Boeing Company, Seattle, Wash.

[21] Appl. No.: 08/743,104

[22] Filed: Nov. 4, 1996

[51] Int. Cl.⁶ .................................. F02K 1/08; F02K 1/46
[52] U.S. Cl. ...................... 60/271; 60/262; 239/265.13; 239/265.17; 181/215
[58] Field of Search ................ 60/262, 271; 239/265.13, 239/265.17, 265.19, 265.23, 265.33, 265.41; 181/215, 216, 220

[56] References Cited

U.S. PATENT DOCUMENTS

| | | |
|---|---|---|
| 2,803,944 | 8/1957 | Kroon . |
| 2,938,335 | 5/1960 | Cook, Jr. ................................. 181/215 |
| 2,952,124 | 9/1960 | Pearson .................................. 181/215 |
| 2,997,845 | 8/1961 | Oulianoff . |
| 3,027,714 | 4/1962 | Parker ................................... 181/215 |
| 3,237,864 | 3/1966 | Taylor et al. . |
| 3,263,931 | 8/1966 | Bartek et al. . |
| 3,333,772 | 8/1967 | Bruner . |
| 3,346,193 | 10/1967 | Tumicki . |
| 3,352,494 | 11/1967 | Colville et al. ......................... 181/215 |
| 3,372,876 | 3/1968 | Colville et al. . |
| 3,409,228 | 11/1968 | Mehr . |
| 3,432,100 | 3/1969 | Hardy et al. . |
| 3,463,402 | 8/1969 | Langston, Jr. . |
| 3,524,588 | 8/1970 | Duval . |
| 3,550,721 | 12/1970 | Bruner . |
| 3,613,826 | 10/1971 | Cabassut . |
| 3,637,041 | 1/1972 | Hilbig . |
| 3,647,020 | 3/1972 | MacDonald . |
| 3,664,455 | 5/1972 | Duvvuri . |
| 3,695,387 | 10/1972 | Hilbig . |
| 3,710,890 | 1/1973 | True et al. .............................. 181/220 |
| 3,774,868 | 11/1973 | Goetz . |
| 3,829,020 | 8/1974 | Stearns .................................. 181/216 |
| 3,830,431 | 8/1974 | Schwartz . |
| 3,897,169 | 7/1975 | Fowler . |
| 3,910,375 | 10/1975 | Hache et al. ......................... 239/265.13 |
| 3,990,530 | 11/1976 | Helfrich et al. .................... 239/265.13 |
| 4,064,692 | 12/1977 | Johnson et al. . |
| 4,074,859 | 2/1978 | Lowman, Jr. ....................... 239/265.33 |
| 4,095,417 | 6/1978 | Banthin . |
| 4,165,609 | 8/1979 | Rudolph . |
| 4,175,640 | 11/1979 | Birch et al. . |
| 4,215,536 | 8/1980 | Rudolph . |

(List continued on next page.)

OTHER PUBLICATIONS

"The Jet Engine," chapters 6, 14, 15 and 19, Rolls–Royce plc, 1992.

Primary Examiner—Timothy S. Thorpe
Assistant Examiner—Ted Kim
Attorney, Agent, or Firm—Christensen O'Connor Johnson & Kindness, PLLC

[57] ABSTRACT

An ejector nozzle (10) including an first cowling (12), a second cowling (14), and opposed upright sidewalls (16) that together form an internal nozzle exhaust path is provided. A reconfigurable plug assembly (18) having separable first and second diverters (20), (22) is located in the exhaust path to direct engine exhaust (24) in either dual paths formed around diverter outer surfaces (76), or dual paths formed between the diverter inner surfaces (74) and centerbody exterior surfaces. When the diverters direct exhaust airflow between themselves, first and second ejectors (26), (28) formed in the first and second cowlings (12), (14), respectively, are available to entrain ambient air (30) into the exhaust stream (24). The preferred ejectors include translatable aft flaps (32), (34). Mixing devices, such as a lobed mixer (90) are incorporated into the diverters (20), (22) to improve engine noise suppression. When the diverters (20), (22) direct exhaust airflow around themselves, the ejectors are closed and the mixing devices are positioned such that they are not significantly exposed to the engine exhaust 24. An actuation assembly moves the diverters (20), (22) and ejectors between various positions.

19 Claims, 4 Drawing Sheets

U.S. PATENT DOCUMENTS

| | | |
|---|---|---|
| 4,422,524 | 12/1983 | Osbron . |
| 4,537,026 | 8/1985 | Nightingale . |
| 4,690,329 | 9/1987 | Madden . |
| 4,819,876 | 4/1989 | Thayer . |
| 4,909,346 | 3/1990 | Torkelson . |
| 4,958,489 | 9/1990 | Simmons . |
| 5,044,553 | 9/1991 | Degress . |
| 5,044,559 | 9/1991 | Russell et al. . |
| 5,154,052 | 10/1992 | Giffin et al. . |
| 5,216,879 | 6/1993 | Zysmaan . |
| 5,261,229 | 11/1993 | Ford et al. .................................. 60/262 |
| 5,291,672 | 3/1994 | Brown . |
| 5,343,697 | 9/1994 | Johnson et al. . |
| 5,351,480 | 10/1994 | Kretschmer . |

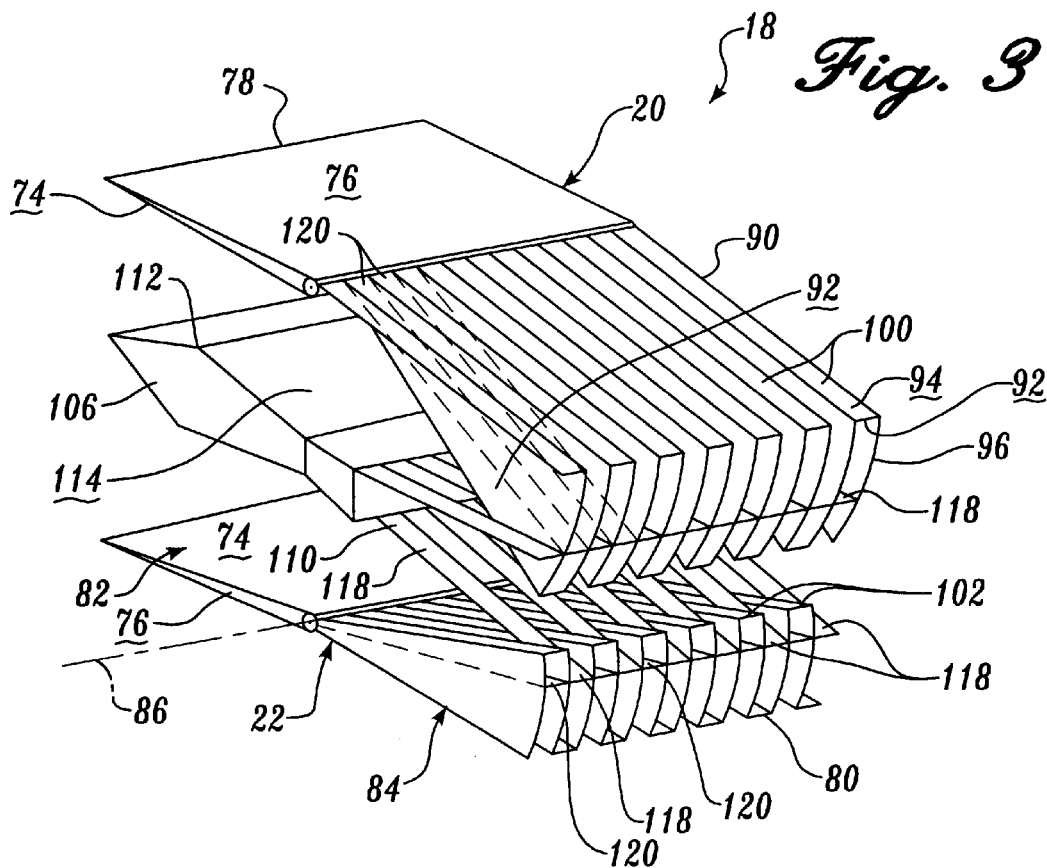
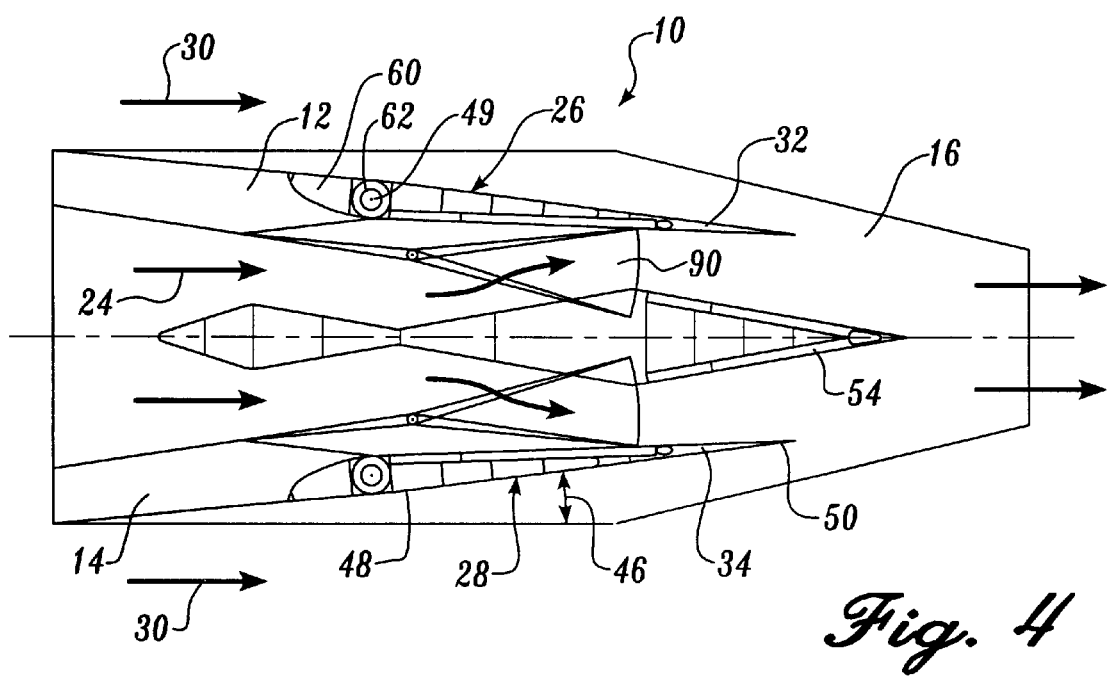

STOWABLE MIXER EJECTION NOZZLE

FIELD OF THE INVENTION

The present invention relates to ejector nozzles, and more particularly, to mixer ejector nozzles for use in maintaining engine performance while suppressing jet noise.

BACKGROUND OF THE INVENTION

In jet engines, it is known to use ejector nozzles to entrain ambient air with engine exhaust gases. The ambient air cools the engine exhaust and improves the overall thrust and performance characteristics during flight. Known systems, such as that described in U.S. Pat. No. 3,409,228, generally include a common nozzle that extends aftward from an engine exhaust source. An ejector inlet located in a nozzle sidewall guides ambient air directly into primary exhaust via an ejector passage connecting the two fluid streams. It is also known to use a nozzle plug assembly or tail cone centrally disposed within the nozzle to control the nozzle duct interior area and shape. Using a plug assembly can greatly increase an engine's propulsive efficiency by allowing the pilot to tailor the engine thrust output and performance characteristics for a specific flight condition.

In recent years it has become important to minimize jet noise, especially during takeoff and landing flight segments. Mixer ejectors, such as "daisy" or lobed designs, provide finger-like mixing lobes at inboard locations along the ejector passage. The lobes work to actively combine ambient air with the engine exhaust. The combined airflow has a lower flow velocity than the average of the separate, uncombined flow velocities. According to current understandings in the art, this lower exhaust exit velocity results in less jet noise.

Because ejectors and mixing components are not needed for all flight conditions, it is known to include additional nozzle parts for stowing the ejectors and mixing components in various nozzle sidewall areas. These additional stowage parts disadvantageously add weight and system complexity to the nozzle. The ejectors, mixing components, and associated parts can also hinder a designer's efforts to create air internal nozzle duct that has a wide range of available shapes for use in a wide range of flight conditions. This is especially problematic when designing for cruise conditions, where pronounced convergent-divergent shapes are required to maximize thrust for given cruise engine settings, mach numbers, and altitudes. Under these circumstances, a desired large duct cross-sectional size may be unattainable due to the space being occupied by an ejector, a mixer, or the various associated components.

Thus, a need exists for a superior aircraft nozzle capable of maintaining engine performance and reducing jet noise through the use of an ejector while additionally providing noise suppression. The ideal nozzle should be configured such that the ejector and mixing structures are present when needed, but not present when not needed. These structures should not interfere with, or limit, the range of available nozzle duct shapes. Preferably, the structures should not add significant additional weight or complexity to the nozzle. The structures should be able to withstand the high temperature, high velocity airflow environment for an entire flight envelope, as well as maintain integrity over the life of an engine installation. The present invention is directed to fulfilling this need.

SUMMARY OF THE INVENTION

In accordance with the present invention, an aircraft engine ejector nozzle that optimizes engine performance and suppresses engine noise by altering the nozzle exhaust duct shape is provided. In a preferred embodiment, the ejector nozzle includes a first cowling, a second cowling, and opposed upright sidewalls that together form an internal nozzle exhaust path. A reconfigurable plug assembly is positioned longitudinally within the nozzle and extends generally between the nozzle sidewalls.

In accordance with aspects of the invention, the reconfigurable plug assembly includes separable first and second diverters located in the exhaust path to direct engine exhaust in either dual paths formed around the outer surfaces of the diverters, or a path formed between the inner diverter surfaces. Each diverter includes an inner surface, an outer surface, a forward end, and an aft end. The first and second diverter inner surfaces are positioned in an opposed relation. In one embodiment, the first and second diverters each include multiple subsections rotatably connected end-to-end. To help direct the flow of exhaust, the reconfigurable plug assembly includes forward and aft centerbodies extending between the sidewalls and located generally along the nozzle longitudinal centerline. The forward and aft centerbodies are formed of outer skins covering a number of lateral support members. A middle centerbody is located between the forward and aft centerbodies.

In accordance with further aspects of the invention, mixing devices are incorporated into the diverters to improve engine noise suppression. The preferred mixing device is a lobed mixer formed in an aft subsection of a diverter. The middle and/or aft centerbodies include openings therein to accommodate the mixing device lobes.

In accordance with other aspects of the invention, first and second ejectors formed in the first and second cowlings, respectively, are available to entrain ambient air into the engine exhaust stream in order to maintain engine thrust performance while reducing jet noise. Preferred ejectors include translatable aft flaps, each having a forward end pivotable about an axis of rotation extending between the sidewalls. Each aft flap is capable of longitudinal translation. An actuation assembly moves the diverters and ejectors between various positions.

In accordance with still further aspects of the invention, the reconfigurable plug assembly includes at least two operable configurations—a first or suppressed mode for use in noise suppression, and a second or non-suppressed mode. The ejectors include opened and closed states. Both the plug assembly and ejectors attain their states via operation of the actuation assembly.

In the first configuration, the actuation assembly positions the diverter forward ends apart from one another and the diverter aft ends apart from one another to direct exhaust between the first and second diverters. The exterior surfaces of the centerbodies and the reconfigurable plug assembly interior surfaces coordinate to form convergent-divergent exhaust paths. During the suppressed mode, the ejectors are typically moved to their opened state in order to entrain ambient air into the engine exhaust and through the mixers. The lobed mixers include outboard and inboard surfaces in which ambient air flows from the ejectors over the lobed mixer outboard surface and engine exhaust flows from the engine over the lobed mixer inboard surface. The engine and ambient airflows thereby mix at the end of the lobed mixer. This arrangement provides noise suppression, which is desirable during takeoff and landing operations. The ejectors may alternatively be positioned in their closed state during the reconfigurable plug assembly second configuration. This arrangement is useful during trans- and subsonic flight as well as reverse thrust.

In the reconfigurable plug assembly second configuration, the actuation assembly positions the diverter forward ends near one another and the diverter aft ends near one another, thus bifurcating the flow to direct exhaust around the reconfigurable plug assembly. The first and second cowling interior surfaces, in conjunction with reconfigurable plug assembly exterior surfaces, form convergent-divergent exhaust paths. In the non-suppressed mode, exhaust air does not generally flow through the lobed mixers because the mixers are substantially "buried" within a centerbody. This advantageously removes the mixers from exposure to the harsh engine exhaust. The ejectors are positioned in their closed state in the non-suppressed mode. This arrangement is particularly useful during supersonic flight, when ejectors and noise suppression are typically not needed.

In accordance with still other aspects of the invention, a plurality of acoustic liners may be attached to airflow surfaces of the aft flaps and centerbodies.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a perspective view looking forward of a portion of the ejector nozzle of FIG. 1;

FIG. 4 is a cross-sectional side view of the ejector nozzle of FIG. 1 as arranged for use during subsonic cruise flight conditions;

DETAILED DESCRIPTION OF THE PREFERRED EMBODIMENT

Figure 1:
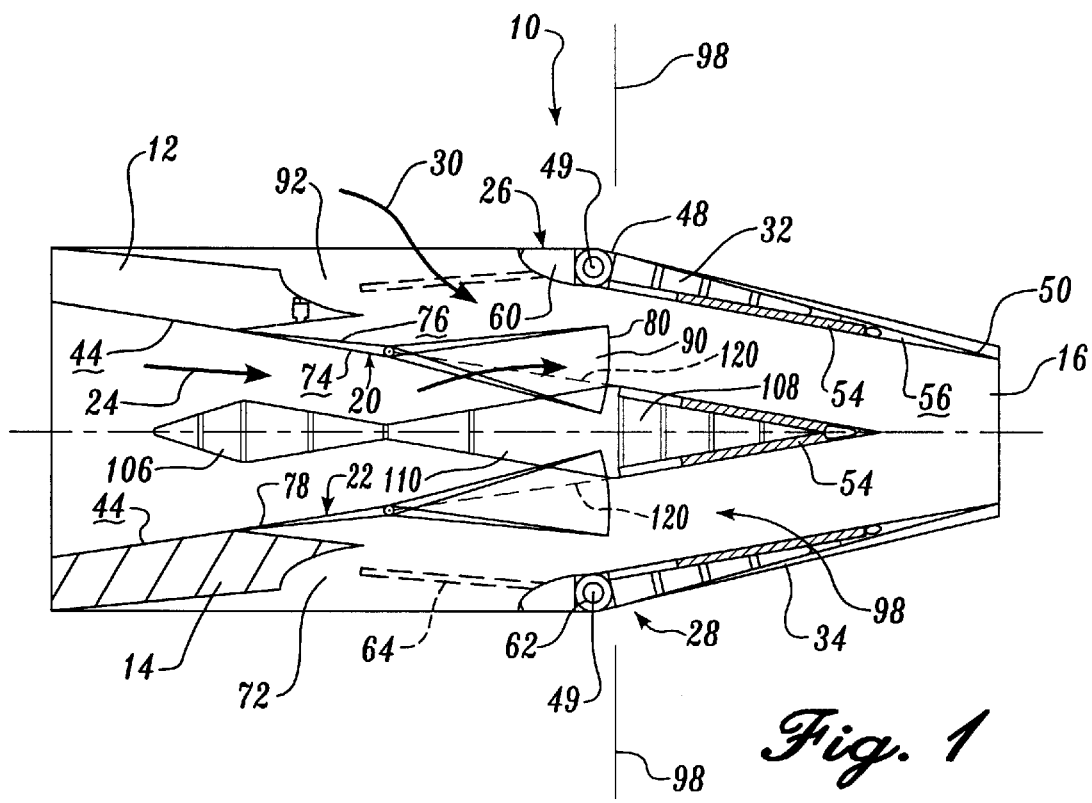
FIG. 1 is a cross-sectional side view of an ejector nozzle formed in accordance with the present invention as arranged for providing noise suppression during a high power engine setting.

The ejector nozzle of the present invention is described herein with relation to a turbofan or turbojet engine in which the nozzle entrains and mixes ambient air with engine exhaust. These limitations are provided for illustrative purposes only. With suitable changes, the present invention can be practiced in other types of engines requiring the mixing of any two airflows, e.g., bypass air with primary exhaust.

In general, an embodiment of an ejector nozzle formed in accordance with the present invention is shown in FIGS. 1–7. The ejector nozzle 10 includes a first or upper outer cowling 12, a second or lower outer cowling 14, and opposed upright sidewalls 16 that together form an internal nozzle exhaust path. A reconfigurable plug assembly 18, having separable first (upper) and second (lower) diverters 20, 22, is located in the exhaust path to direct engine exhaust, depicted by arrow 24, in either a dual path formed around diverter outer surfaces 76, or a path formed between the inner diverter surfaces 74. When the diverters 20, 22 direct exhaust airflow 24 between themselves, first (upper) and second (lower) ejectors 26, 28 formed in the upper and lower cowlings 12, 14, respectively, are available to entrain ambient air, depicted by arrow 30, into the exhaust stream in order to maintain engine performance while reducing the jet velocity. The preferred ejectors 26, 28 include translatable aft flaps 32, 34. Mixing devices are incorporated into the diverters 20, 22 to enhance mixing and increase noise frequency to ranges amenable for acoustic treatment. When the diverters 20, 22 direct exhaust airflow 24 around themselves, the ejectors 26, 28 are closed and the mixing devices are positioned such that they are not exposed to the engine exhaust 24. See FIG. 5. The upper and lower cowlings 12, 14 coordinate with the diverters 20, 22 to form convergent-divergent exhaust path shapes that improve the nozzle performance. An actuation assembly (not shown) moves the diverters 20, 22 and ejectors 26, 28 between various positions.

In detail, referring to FIGS. 1–7, the present invention ejector nozzle exhaust path or duct is defined by cowling inner surfaces 44 and the opposed nozzle sidewalls 16. The exhaust path begins at the nozzle forward end near the source of the engine exhaust, e.g., a gas generator. The exhaust path terminates by opening to the atmosphere at the nozzle aft end. This allows all exhaust gases to finally exit the entire propulsion installation. There should optimally exist a slight inward slope or convergence 46 in the aft direction to the outer cowlings of about 2 to 6 degrees when the ejector is in its closed position. This is helpful for reducing aft body drag (i.e., boat tail drag), a preferred angle being about 4 degrees.

Structurally, the nozzle forward end is attached to, or integrally formed with, an exit area of the engine casing or other appropriate installation structure, such as a common nozzle. As is known in the art, various struts and support beams are used in the sidewalls 16, casings, and cowlings 12, 14 to support the nozzle static and dynamic loads. These structures are modified appropriately to support the nozzle of the present invention. The sidewalls 16 and cowlings 12, 14, and their inner surfaces in particular, should be formed of heat and corrosion tolerant materials, e.g., a nickel-based super alloy. The nozzle 10 is typically circular in cross-sectional shape at its forward end, but quickly transitions to a generally rectangular cross-sectional shape. The sidewall inner surfaces downstream of the nozzle forward end are generally smooth and longitudinally linear. The cowling inner surfaces 44 are also smooth, though, of varying longitudinal shapes.

Figure 2:
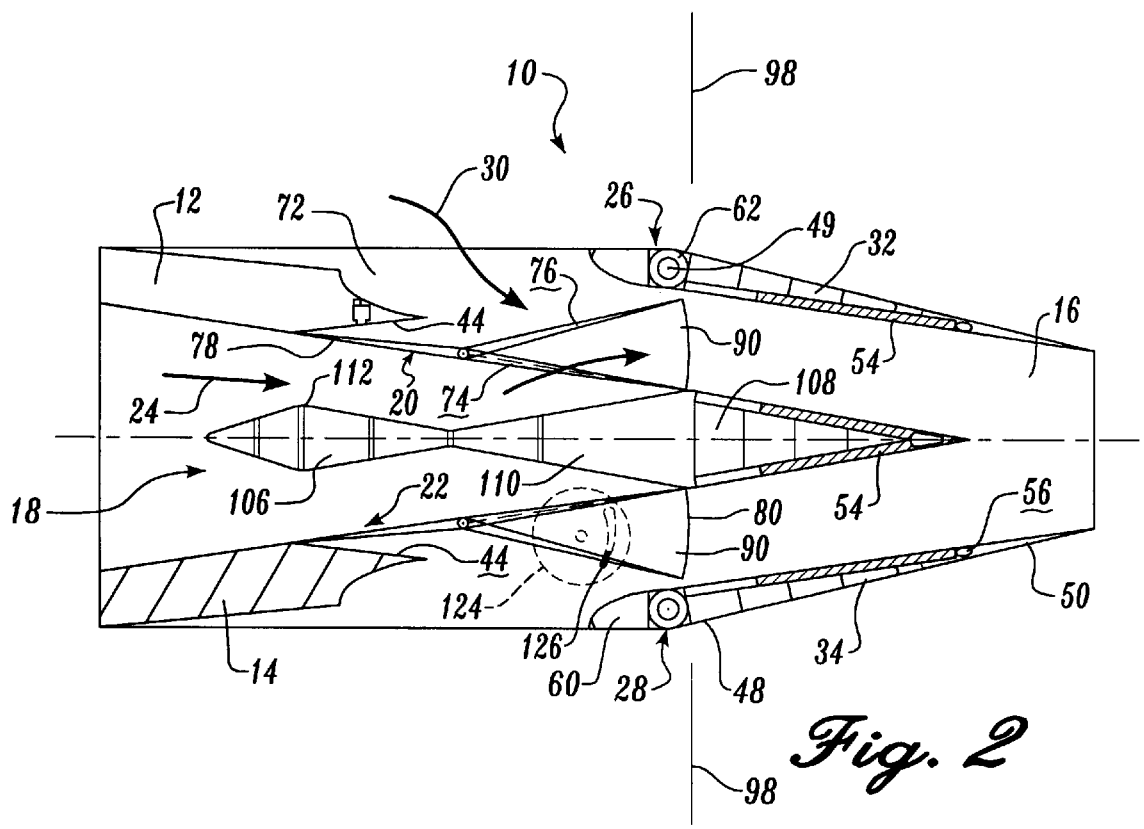
FIG. 2 is a cross-sectional side view of the ejector nozzle of FIG. 1 as arranged for providing noise suppression during a low power engine setting.

Referring to FIG. 1, an ejector is formed in each cowling 12, 14. There are many types of conventional ejectors that can be used with the present invention. The preferred ejector includes first (upper) and second (lower) translatable aft flaps 32, 34 that actually form a majority of the upper and lower cowlings 12, 14, respectively. The aft flaps 32, 34 each have a forward end 48 and a tapered aft end 50. The forward ends 48 are rotatable about axes of rotation 49 extending generally normally between the nozzle sidewalls 16. The aft flaps 32, 34 should be formed of rigid, temperature and corrosion resistant materials. It is recommended for the aft flaps 32, 34 to also include a plurality of acoustic liners 54 positioned along aft flap inner surfaces 56. Acoustic liners 54 can help reduce noise caused by the mixing devices, as well as the engine exhaust 24. The aft flaps 32, 34 should be capable of fore and aft translation, as well as simultaneous independent rotation about their forward ends 48. As illustrated in FIGS. 1 and 2, a small aerodynamically-shaped joining section 60 is included forward of the aft flaps, from which the aft flap is rotatably connected. This type of ejector is preferred because it uses few components to perform the dual tasks of entraining ambient air and tailoring the shape of the internal nozzle exhaust path to improve engine performance.

As with other movable components of the present invention, there are a number of known methods of actuation that may be used to move the aft flaps 32, 34. One example is shown in phantom in FIG. 1. An axial rod 62 centered about the aft flap axis of rotation 49 is connected to the small joining section 60. The aft flaps 32, 34 are rotatably joined to the rods. The rods themselves span between slots 64 formed in the sidewalls 16. Linear actuators anchored within the sidewalls 16 and connected to the rods, push the rods along the slots 64. Rotary actuators (not shown) anchored within the small joining section 60 and connected to the translating aft flaps 32, 34 rotate the aft flaps about the rods 62.

The ejector has an opened state and a closed state. In the opened state (FIGS. 1 and 2), the space between each small joining section 60 and its respective upstream outer cowling, provides an inwardly-angled passage 72 that extends from an exterior cowl location to intersect with a divergent flow region of the internal nozzle exhaust path. The preferred passage 72 should be aerodynamically design to actually guide ambient air 30 into the path of the engine exhaust 24, as opposed to merely allowing ambient air to enter the exhaust path unguided. In the ejector closed state, (FIGS. 4 and 5), the aft flap and small joining section 60 are translated forward to meet the upstream outer cowling structure, thus closing the nozzle 10 to ambient air 30 input. The small joining section 60 is shaped such that a close fit occurs between it and the adjacent upstream cowl structure, effectively sealing the engine exhaust from the ambient flow.

When the ejectors are open, the static pressure downstream of the mixing devices is less than the static pressure outside the nozzle 10. This creates a natural tendency for ambient air 30 to be drawn through the ejector passage 72 into the internal nozzle exhaust path. To control entrainment, the mixing devices (discussed below) are rotated, creating a larger or smaller ambient mixing area, depending on the desired effect. The precise dimensions of the ejectors 26, 28 will depend in part on the space available and the amount of maximum ambient airflow required, as well as other factors known to those skilled in the art.

The plug assembly 18 is reconfigurable by means of the separable upper and lower diverters 20, 22 and the actuation assembly. Referring specifically to FIG. 3, the diverters 20, 22 each include an inner surface 74, an outer surface 76, a forward end 78, and an aft end 80. The forward ends 78 are forwardly tapered to form aerodynamic leading edges. Shown in FIG. 1, the diverters 20, 22 span normally between the nozzle sidewalls 16, with their forward ends 78 being located upstream of the ejector inlet passages 72 and their aft ends 80 being located downstream of the ejector inlet passages 72.

Although substantially rigid, the diverters 20, 22 should be capable of assuming different, generally arcuate, shapes. In particular, the diverters must be able to assume both convex and concave shapes when viewed in a longitudinal-vertical plane. Shown in FIG. 5, the diverters 20, 22 are curved inward, i.e., a convex shape. Shown in FIGS. 1, 2 and 4, the diverters 20, 22 are curved outward, i.e., a concave shape. Such curvature variations can be realized in various ways, depending in part on the method of actuation to be used. The preferred method is to form the diverters 20, 22 from multiple subsections that are rotatably connected end-to-end, and that extend between the sidewalls 16.

One such preferred diverter embodiment is illustrated in FIGS. 1–7. In this embodiment, fore and aft subsections 82, 84 are pivotably attached end-to-end about stationary axes of rotation 86 oriented transverse to the sidewalls 16. See FIG. 3. The forward end of the fore subsection 82 forms the diverter forward end 78. The aft end of the aft subsection 84 forms the diverter aft end 80. The subsections 82, 84 are roughly the same size in thickness and length, and extend substantially the entire lateral distance between the sidewalls 16. The precise dimensional values will depend upon various factors, e.g., the pressure bending loads of a particular application. The subsections 82, 84 allow each diverter to form the necessary concave and convex shapes. Other diverter embodiments capable of providing the same basic shapes may be used instead.

The diverters 20, 22 may be formed by attaching an outer skin to a number of interconnected structural elements. This general type of construction is known and is omitted from FIGS. 1–7 for illustrative clarity. Preferred diverter skin materials include nickel-based super alloys or other heat tolerant materials.

To reduce jet noise, each diverter includes one or more mixing devices. By way of example, lobed mixers 90 are shown in FIGS. 1–7. Other mixing devices may be used, e.g., ramps, tabs, spades, etc. Each lobed mixer 90 includes continuous inner and outer surfaces 92, 94 that form a number of vertically-oriented, finger-like lobes 96. The lobes 96 (see FIG. 3) start at the common axis of rotation 86 and progress longitudinally aftward with an ever-increasing vertical size. The lobes 96 terminate at a mixing plane 98 as shown in FIG. 2. A convergent flow path is formed for both the primary and ambient flows, with a throat being established for the engine exhaust 24 at the mixing plane 98. The amount of ambient air 30 as compared to engine air will depend on the specific design and flight condition.

Referring back to FIG. 3, the engine exhaust 24 "sees" the inner surfaces 92 formed by lobe mixer peak regions 100. The peak regions 100 alternate laterally with trough regions 102 in the lobed mixer 90. The lobed mixer outer surface 94 at the trough regions 102 forms the lobe passages utilized by the entrained ambient air 30. At the mixing plane 98, vertical "slices" of ambient air 30 alternate with vertical "slices" of engine exhaust 24. This provides a generous amount of sheering surface between the airflows, thus improving the opportunities for mixing. As stated above, with appropriate modifications, any one of a number of available ejectors and mixing devices may be adapted for use in the present invention nozzle.

In addition to the diverters 20, 22, the reconfigurable plug assembly 18 includes stationary forward, aft, and middle centerbodies 106, 108, 110. The middle centerbody 110 is located longitudinally between the forward and aft centerbodies 106, 108. The forward and aft centerbodies 106, 108 are formed by attaching outer skins to a number of lateral support members connected between the nozzle sidewalls 16. The forward end of the forward centerbody serves as the reconfigurable plug assembly forward end and is tapered to form an aerodynamic leading edge. In the cross-sectional views of FIGS. 1–2 and 4–5, the forward centerbody 106 preferably continues rearward from the forward edge in a divergent manner. After forming a first peak 112, the forward centerbody 106 cross-sectional shape converges to a longitudinal location approximately directly between the axes of rotation 86 interconnecting the fore and aft subsections 82, 84 of the diverters. The forward centerbody 106 then diverges a short distance and ends bluntly. As viewed in FIGS. 1–2, the forward centerbody 106 cross-sectional shape resembles a horizontally elongated diamond shape with a half diamond shape attached to its aft end to form the last divergent portion. The aft centerbody 108 cross-sectional shape resembles a longitudinally elongated equilateral triangle with the forward end being a generally upright structure. The aft end of the aft centerbody is aerodynamically tapered to form the plug assembly aft end. The aft centerbody forward end is longitudinally located near the diverter aft ends 80.

The middle centerbody 110 includes a number of longitudinal openings or slits to accommodate the lobed mixer 90 during certain plug assembly positions described below. Alternatively, and as shown in FIG. 3, rearwardly extending fingers or slats 118 (as opposed to slits in a solid structure) may be used instead to provide the equivalent function. The slats 118 are positioned to allow the lobed mixer 90 to mesh therebetween without conflict. Slots or a solid structure 120 with openings or slits are also attached from the diverter axes 86 to the forward end of the aft centerbody. This fixed structure closes out the lobed mixer so that ambient air is not directed into the centerbody, but around the centerbody instead. The corresponding fingers 120 are shown in FIGS. 1 and 3 only. They are omitted from FIGS. 2, 4–7 for illustrative clarity.

For embodiments not using a lobed mixer, the selected mixing device and centerbodies should be formed such that the mixing device may be stowed easily in a centerbody. For some embodiments, this may require that the middle centerbody be omitted entirely. The diverters 20, 22, centerbodies, and/or aft flaps 32, 34 may optionally include acoustic lining 54 attached to, or preferably embedded in, their exterior surfaces.

The reconfigurable plug assembly 18 has at least two basic configurations. In a first configuration or suppressed mode, shown in FIGS. 1 and 2, the first and second diverter forward ends 78 are located apart from each other and adjacent the upper and lower cowling inner surfaces 44, respectively. The upper and lower diverter aft ends 80 are also located apart from one another, and preferably near the inner surface 44 of their respective outer cowlings. In FIGS. 1 and 2 the aft flaps 32, 34 actually form part of the cowlings 12, 14, therefore the diverter aft ends 80 are located near the aft flaps 32, 34 and hence rearward of the ejector passages 72. The middle of the diverters maintain a spaced-apart relation. The first configuration thus offers a bifurcated exhaust path for engine exhaust 24 that is bounded by the diverter inner surfaces 74 and the centerbody outer surfaces. These bifurcated paths are also preferably formed with a throat region located at the trailing edge of the aft diverter 80. When the diverters 20, 22 direct exhaust airflow between themselves, the first and second ejectors 26, 28 may be moved to their opened position to entrain ambient air 30 into the exhaust stream 24. Because the mixing devices are located in an aft subsection positioned near the ejector passages 72, a portion of the incoming ambient air 30 is passed through the mixing device along its outer surface 94. Engine exhaust 24 passes along its inner surface 92. The two flows meet at the mixing plane 98.

Figure 5:
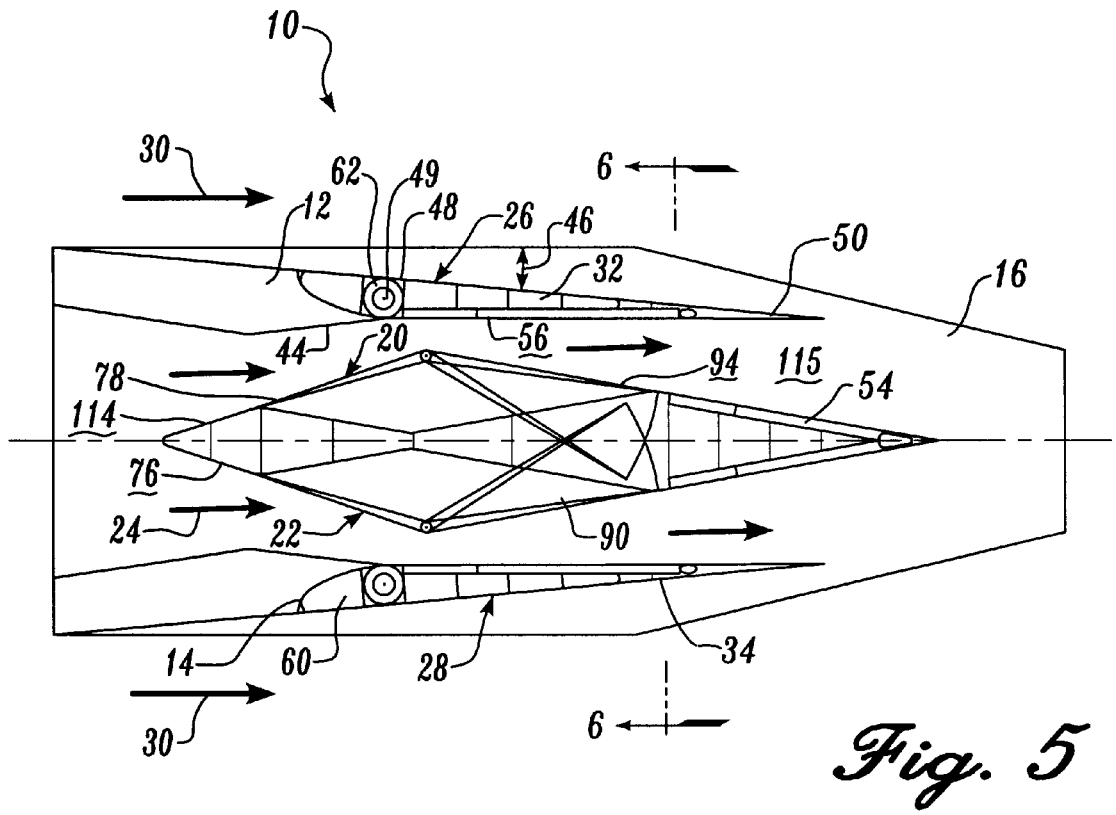
FIG. 5 is a cross-sectional side view of the ejector nozzle of FIG. 1 as arranged for use during supersonic cruise flight conditions.
Figure 6:
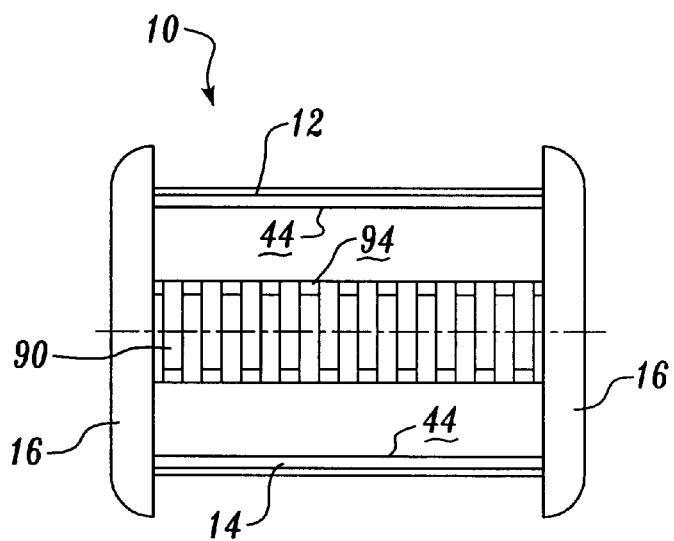
FIG. 6 is a cross-sectional end view of the ejector nozzle of FIG. 5.

In a second configuration or non-suppressed mode, shown in FIG. 5, the first and second diverter forward ends 78 are located near each other and flush with the outer surface 114 of the forward centerbody 106. The first and second diverter aft ends 80 are located near each other and intermeshed with the middle centerbody 110 as well as each other. The outer surfaces 94 of the mixing device should provide a smooth airflow surface with the outer surfaces 115 of the aft centerbody 108. In some configurations it may be necessary to form openings in multiple centerbodies so that the mixing devices do not conflict with the centerbodies during the second configuration. In the non-suppressed mode, the diverters assume a convex shape, thus resembling a splitter when viewed from the side. The internal nozzle exhaust path is bifurcated into two sub-paths that extend around the diverter outer surfaces 76. The cowlings 12, 14 and plug assembly 18 should preferably be shaped such that each sub-path forms a throat to the passing engine exhaust 24, preferably located near the longitudinal middle of each diverter, e.g., in FIGS. 1–7 at the rotatable connection of the fore and aft subsections 82, 84.

As will be recognized from viewing FIGS. 1 and 2, when the plug assembly 18 is in the first configuration and the ejectors 26, 28 are open, the mixing devices are exposed to both engine and ambient airflows 24, 30. When the plug assembly 18 is in its second configuration, the mixing devices are covered from these airflows. The plug assembly second configuration is therefore most useful during flight segments not requiring noise suppression.

The actuation assembly may be formed using any of a number of conventional techniques. In addition to the arrangement described above with respect to the aft flaps 32, 34, various arrangements are available for reconfiguring the plug assembly 18. One actuation assembly embodiment, indicated in phantom line in FIG. 2, utilizes the known technique of rotating disks 124 or annuluses. These disks are positioned at, or in, both sidewalls 16 in a generally coplanar arrangement. The disks connect to various locations along the lateral sides of the first and second diverters with sliding pin joints 126. In order to shield the disks from direct exposure to the exhaust gases in the duct, the disks 124 are embedded in the sidewalls 16. The disks 124 are connected to the sidewalls 16 in a manner to allow only rotational movement about their axes. The disks 124 are caused to rotate by any one of a number of actuation methods, e.g., via use of linear or rotary actuators.

Rotating disks is one means of an actuation assembly, but not the only configuration encompassed by the present invention. In particular, a designer may use any appropriate available method capable of moving the diverters between their first and second configurations and all positions therebetween, e.g., via use of a number of linear or rotary actuators connected directly to the diverters.

During flight operations, the reconfigurable plug assembly 18 and ejectors 26, 28 are moved between their available states to form the most efficient exhaust path arrangement given the engine and flight conditions. In particular, referring to FIG. 1, the ejector nozzle 10 is configured for providing noise suppression during a high engine power setting (i.e., a smaller engine cycle throat). This arrangement results in having the greatest amount of ambient air 30 injected in, and mixed with, a fast-flowing engine exhaust 24, i.e., in a region where ejector pumping is most effective. The most important aspects of this mode include having the plug assembly 18 positioned in its first configuration. The other important aspect of this mode is that the ejectors 26, 28 be moved to the opened state. The aft flaps 32, 34 may be angled inboard to provide correct engine matching.

Referring to FIG. 2, the ejector nozzle 10 is configured for providing noise suppression during a low engine power setting (i.e., a larger engine cycle throat). This mode of operation is similar to the high power mode except the aft ends of the mixing devices are extended outward to contact the cowling inner surfaces 44, thus creating a larger engine exhaust throat.

Referring to FIG. 4, the ejector nozzle 10 is configured for subsonic and transonic cruise flight. Noise suppression is not typically required during these flight conditions. Therefore, the ejector inlets 26, 28 are closed. The mixing device aft ends are still positioned adjacent the cowling inner surfaces 44. This is done to maintain control of the nozzle throat in an aft position in order to optimize the nozzle performance during the low area ratio modes of operation by reducing the surface area being scrubbed by the high velocity flow.

Referring to FIG. 5, the ejector nozzle 10 is configured for supersonic cruise mode. Noise suppression is not required here either, so the ejectors 26, 28 remain closed. The reconfigurable plug assembly 18 is moved to its position so that engine exhaust 24 flows around the diverters 20, 22. The mixing device aft ends are intermeshed within the middle centerbody 110 and thus "hidden" from engine exhaust 24.

Figure 7:
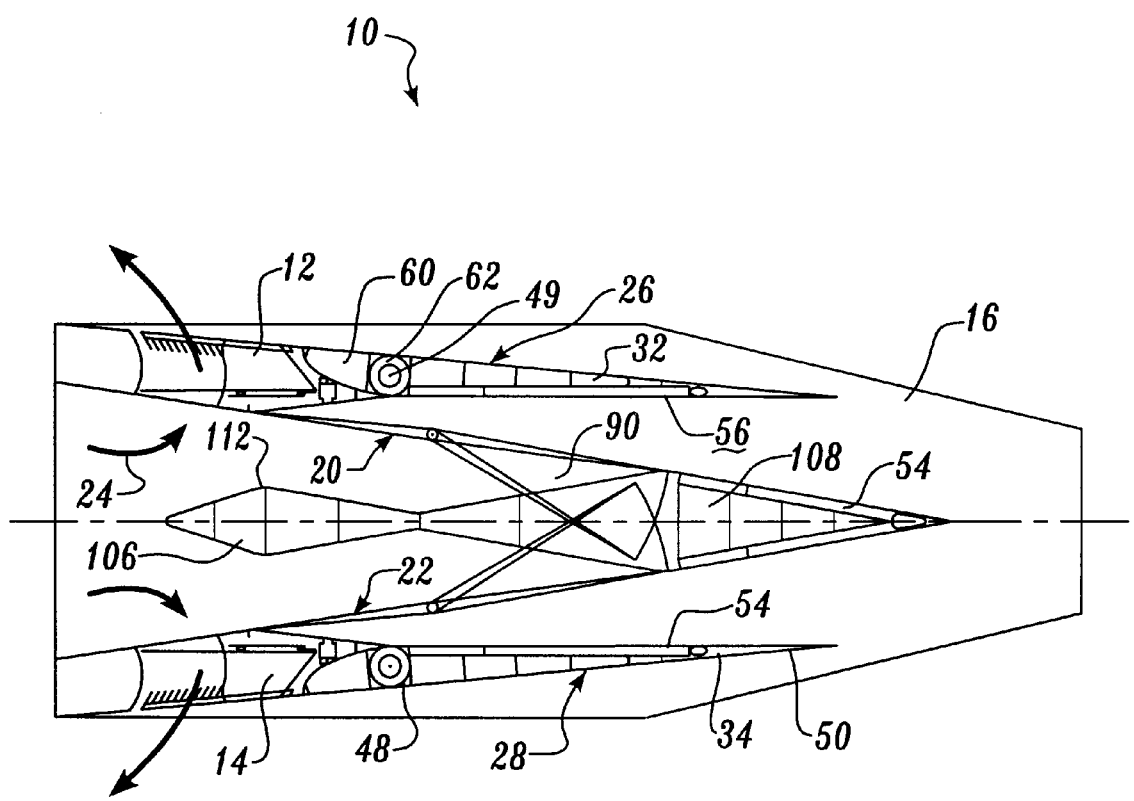
FIG. 7 is a cross-sectional side view of the ejector nozzle of FIG. 1 as arranged during reverse thrust.

During reverse thrust as shown in FIG. 7, it is advantageous to divert exhaust gases out of the engine prior to reaching the ejector nozzle 10, e.g., through cascades in the cowlings 12 and 14 upstream of the cowling aft ends. The advantages of doing so include less weight required to support thrust reverser components from the engine strut attachments and less space required for their presence. Because the exhaust 24 should be diverted prior to reaching the ejector nozzle 10, the precise configuration of the plug assembly 18 and aft flaps 32, 34 is not of significance during reverse thrust.

While the presently preferred embodiment of the invention has been illustrated and described, it will be appreciated that various changes can be made therein without departing from the spirit and scope of the invention. In particular, there are a number of ejector designs which may be used with the present invention. For example, it is possible to use an ejector having inner and outer doors that cover an embedded passage, hinged aft flaps being optionally provided for adjusting the exhaust path shape. Likewise, there are a number of mixing devices and mixing arrangements which could be substituted for the lobed mixer 90 described above. In addition, a computer control system may be utilized to coordinate the rotations between diverters and ejectors.

The embodiments of the invention in which an exclusive property or privilege is claimed are defined as follows:

1. An aircraft engine ejector nozzle for maintaining engine performance while suppressing engine noise, the nozzle comprising:
   (a) a reconfigurable plug assembly extending between upright nozzle sidewalls, the plug assembly comprising:
      (i) separable first and second diverters each extending between the nozzle sidewalls and having a forward end and an aft end, each diverter including a mixing device located near each diverter's aft end; the first and second diverters being positioned in a generally opposed longitudinal relationship about a centerbody, the forward ends of the diverters being rotatably connected to the aft ends; and
      (ii) the centerbody extending laterally between the nozzle sidewalls and elevationally between the first and second diverters;
   (b) first and second outer cowlings located outboard of the plug assembly, each outer cowling including an ejector for directing ambient air into the exhaust airflow, the ejectors being located elevationally near the mixing devices; and
   (c) an actuation assembly for moving the reconfigurable plug assembly between at least two distinct configurations; a first configuration including positioning the diverter forward ends apart from one another and the centerbody and the diverter aft ends apart from one another and the centerbody so as to direct exhaust between the first and second diverters though around the centerbody; and a second configuration including positioning the diverter forward ends toward one another and the centerbody and the diverter aft ends toward one another and the centerbody so as to direct exhaust around the reconfigurable plug assembly and around an outer peripheral surface of the diverters.

2. The nozzle according to claim 1, wherein the ejectors each include translatable aft flaps.

3. The nozzle according to claim 2, wherein translatable aft flaps each include forward ends pivotable about axes of rotation spanning between the sidewalls.

4. The nozzle according to claim 1, further including a plurality of acoustic liners attached to the surfaces of at least one of the aft flaps and centerbody.

5. The nozzle according to claim 1, wherein the ejectors include opened and closed states; and wherein the reconfigurable plug assembly first configuration further includes positioning the ejectors in their opened state.

6. The nozzle according to claim 1, wherein the ejectors include opened and closed states; and wherein the reconfigurable plug assembly first configuration further includes positioning the ejectors in their closed state.

7. The nozzle according to claim 1, wherein the ejectors include opened and closed states; and wherein the reconfigurable plug assembly second configuration further includes positioning the ejectors in their closed state.

8. The nozzle according to claim 1, wherein the mixing device is a lobed mixer located near the aft end of each first and second diverter.

9. The nozzle according to claim 8, wherein the reconfigurable plug assembly includes a forward centerbody, an aft centerbody, and a middle centerbody located between the forward and aft centerbodies, the middle centerbody having openings to accommodate the lobed mixer during the reconfigurable plug assembly second configuration.

10. The nozzle according to claim 1, wherein the centerbody is formed of outer skins covering a number of lateral support members.

11. The nozzle according to claim 1, wherein first and second cowlings interior duct surfaces in conjunction with reconfigurable plug assembly exterior surfaces form a convergent-divergent exhaust path during the reconfigurable plug assembly second configuration.

12. The nozzle according to claim 1, wherein reconfigurable plug assembly interior surfaces and centerbody exterior surfaces form convergent-divergent exhaust paths during the reconfigurable plug assembly first configuration.

13. The nozzle according to claim 1, wherein the first and second diverters each include at least two subsections rotatably connected end-to-end, the axis of rotation oriented transverse to the sidewalls.

14. The nozzle according to claim 13, wherein the axes of rotation is stationary relative to the sidewalls.

15. The nozzle according to claim 1, wherein during the reconfigurable plug assembly second configuration, the lobed mixers are positioned such that air does not generally flow through the lobed mixers.

16. An aircraft engine ejector nozzle for maintaining engine performance while suppressing engine noise, the nozzle comprising:

(a) a reconfigurable plug assembly extending between upright nozzle sidewalls, the plug assembly comprising:
  (i) separable first and second diverters each extending between the nozzle sidewalls and having a forward end and an aft end, the first and second diverters each including a number of subsections rotatably connected end-to-end, each diverter including a lobed mixer located in an aft subsection of the diverter, the first and second diverters being positioned in a generally opposed longitudinal relationship about a centerbody assembly; and
  (ii) the centerbody assembly comprising a forward centerbody, an aft centerbody, and a middle centerbody located between the forward and aft centerbodies, each extending laterally between the nozzle sidewalls and elevationally between the first and second diverters;
(b) first and second outer cowlings located outboard of the plug assembly, each outer cowling including an ejector for directing ambient air into the exhaust airflow, the ejectors being located elevationally near the mixing devices, the ejector comprising a translatable aft flap pivotably and translatably connected to the upright sidewalls at an aft flap forward end; and
(c) an actuation assembly for moving the reconfigurable plug assembly between at least two distinct configurations; a first configuration including positioning the diverter forward ends apart from one another and the centerbody assembly and the diverter aft ends apart from one another and the centerbody assembly so as to direct exhaust between the first and second diverters though around the centerbodies; and a second configuration including positioning the diverter forward ends toward one another and the centerbody assembly and the diverter aft ends toward one another and the centerbody so as to direct exhaust around the reconfigurable plug assembly and an outer peripheral surface of the diverters, at least one of the aft and middle centerbodies having openings to accommodate the lobed mixer during the reconfigurable plug assembly second configuration.

17. The nozzle according to claim 16, wherein the ejectors include opened and closed states and the lobed mixers include outboard and inboard surfaces, wherein during the reconfigurable plug assembly first configuration ambient air flows from the ejectors over the lobed mixer outboard surface and engine exhaust flows from the engine over the lobed mixer inboard surface; the engine and ambient air flows thereby mixing downstream of the lobed mixer.

18. The nozzle according to claim 16, wherein during the reconfigurable plug assembly second configuration, the lobed mixers are positioned such that air does not generally flow through the lobed mixers.

19. The nozzle according to claim 16, wherein the reconfigurable plug assembly is longitudinally translatable.

* * * * *